United States Patent [19]
Forster et al.

[11] Patent Number: 5,611,961
[45] Date of Patent: Mar. 18, 1997

[54] METHOD OF PREPARING MANGANESE ACTIVATED ZINC ORTHOSILICATE PHOSPHOR

[75] Inventors: Cheryl M. Forster, Vau Etten, N.Y.; Anthony F. Kasenga, Towanda; Chung N. Chau, Sayre, both of Pa.

[73] Assignee: Osram Sylvania Inc., Danvers, Mass.

[21] Appl. No.: 306,046

[22] Filed: Sep. 14, 1994

[51] Int. Cl.$^6$ .................................................... C09K 11/54
[52] U.S. Cl. .............................. 252/301.6 F; 252/301.4 F
[58] Field of Search ........................ 252/301.6 F, 301.4 F

[56] References Cited

U.S. PATENT DOCUMENTS

| | | | |
|---|---|---|---|
| 2,210,087 | 8/1940 | Leverenz | 250/81 |
| 2,245,414 | 6/1941 | Roberts | 250/81 |
| 2,306,270 | 12/1942 | Leverenz | 250/81 |
| 2,656,320 | 10/1953 | Nagy et al. | 252/301.6 |
| 3,416,019 | 12/1968 | Kaduk | 252/301.6 F |
| 4,728,459 | 3/1988 | Fan et al. | 252/301.5 |
| 4,806,822 | 2/1989 | Takahara et al. | 252/301.6 F |
| 4,892,757 | 1/1990 | Kasenga et al. | 252/301.5 |
| 5,188,763 | 2/1993 | Chenot et al. | 252/301.5 |
| 5,196,234 | 3/1993 | Taubner et al. | 427/213 |
| 5,207,948 | 5/1993 | Wolfe et al. | 252/301.36 |
| 5,234,625 | 8/1993 | Forster | 252/301.4 |

*Primary Examiner*—Melissa Bonner
*Attorney, Agent, or Firm*—Robert F. Clark

[57] ABSTRACT

A process for producing a manganese activated zinc orthosilicate phosphor. An aqueous dispersion is prepared including fumed silica having an ultrafine average particle size of less than 50 nm, a zinc precursor, and a manganese precursor. The molar ratio of zinc:silicon in the dispersion is approximately 1.3:1 to 2.0:1, and the molar ratio of manganese in the dispersion is sufficient to activate the phosphor. The precipitate from the dispersion is calcined in an inert atmosphere at a temperature and for a time sufficient to form a manganese activated zinc silicate phosphor having a broad band emission peaking in the green region of the visible spectrum when stimulated by external radiation at approximately 254 nm. The calcined phosphor may be milled to achieve an average particle size of less than 5 μm, the milling step being performed without significant loss of plaque brightness. Also disclosed is a green emitting manganese activated zinc silicate phosphor having an average particle size of less than 5 μm and excellent brightness.

7 Claims, No Drawings

METHOD OF PREPARING MANGANESE ACTIVATED ZINC ORTHOSILICATE PHOSPHOR

CROSS-REFERENCE TO RELATED APPLICATIONS

The present application contains subject matter related to U.S. application Ser. No. 08/306,080, commonly assigned and filed concurrently herewith, now U.S. Pat. No. 5,472,636.

BACKGROUND OF THE INVENTION

The present invention relates to fluorescent lamp phosphors, and particularly relates to a method of preparing a manganese activated zinc orthosilicate phosphor and the phosphor produced thereby.

Manganese activated zinc silicate phosphors emitting in the green region of the visible spectrum are used, for example, in fluorescent lamps and cathode ray tubes. Prior art methods of preparing manganese activated zinc silicate phosphors ensure reactivity between the zinc and the manganese by various means. Such reactivity depends on efficient and complete incorporation of the dopant concentration levels of manganese ion used in the phosphor. For example, some processes have used an excess quantity of silica in the starting formulation to assist such reactivity. However, unreacted components in a phosphor can be detrimental to the light output of a lamp, although an excess amount of unreacted silica is less detrimental than excess metal oxide because of the metal oxide's greater absorption of ultraviolet radiation. Other processes use additives to facilitate a complete reaction. For example, magnesium difluoride may be used as a flux, or tungsten trioxide may be added to improve lamp maintenance, i.e., to lessen the loss of light output over the life of the lamp. The tungsten trioxide may be added to a silica containing formulation, or it may be added to a silicic acid based formulation with or without 0.01–1.0% of colloidal silica to reduce blending time. Other processes have added ammonium chloride and ammonium fluoride as reaction agents. Using additives to assist the reaction, however, can increase the particle size of the asfired phosphor.

Manganese activated zinc silicate phosphors must be reduced to a small particle size for use in either lamp applications or tagging applications. In particular, tagging applications require a fine particle size phosphor, i.e., less than 5 µm, to avoid abrasion of the tagging equipment by the phosphor particles. The term "tagging" is used herein to refer to the application of a phosphor to an item for identification purposes. The phosphor may be applied directly to the item, e.g. to fabric or paper, or may be added to a coating or ink for application to the item.

Known manganese activated zinc silicate phosphors can have an average milled particle size of 5–7 µm when the silicon source in the starting formulation is silicic acid, the most commonly used silicon starting material in phosphor production. It is difficult to achieve particle sizes small enough for use in tagging machines with the silicic acid derived phosphors. Extensive further milling of these prior art phosphors is required. Even for use in an ordinary fluorescent lamp, the silicic acid derived phosphor must be vigorously milled. However, such extensive milling alters the surface characteristics of the phosphor crystals, decreasing the brightness of the phosphor.

It would be desirable to have a green emitting manganese activated zinc silicate phosphor exhibiting a particle size of less than 5 µm without significant loss of lamp brightness. It would also be desirable to provide improved control of the final particle size and morphology, and to achieve this control and small particle size at lower firing times and temperatures than are necessary with silicic acid derived phosphors. The phosphor and process described herein were developed to address that need.

Accordingly, it is an object of this invention to provide a process for producing a manganese activated zinc orthosilicate phosphor utilizing an ultrafine silica component as the silicon source in the starting formulation.

It is another object of this invention to provide a process for producing a manganese activated zinc orthosilicate phosphor providing improved control of the final particle size and morphology of the phosphor.

It is a further object of this invention to produce a manganese activated zinc orthosilicate phosphor having a primary particle size of less than 5 µm and a plaque brightness equivalent to that of a commercially available manganese activated zinc orthosilicate phosphor.

SUMMARY OF THE INVENTION

In one aspect, the invention is a process for producing a manganese activated zinc orthosilicate phosphor having the nominal formula $Zn_2SiO_4$:Mn. The method involves preparing a uniform aqueous dispersion including fumed silica having an ultrafine average particle size of less than 50 nm, a zinc precursor, and a manganese precursor. The molar ratio of zinc:silicon in the dispersion is approximately 1.3:1 to 2.0:1, and the molar ratio of manganese in the dispersion is sufficient to activate said phosphor. The precipitate from the dispersion is calcined in an inert atmosphere at a temperature and for a time sufficient to form a manganese activated zinc silicate phosphor having a broad band emission peaking in the green region of the visible spectrum when stimulated by external radiation at approximately 254 nm. In a narrower aspect, the process may further include the step of milling the calcined phosphor to achieve an average particle size of less than 5 µm, the milling step being performed without significant loss of plaque brightness.

In another aspect, the invention is a homogeneous manganese activated zinc silicate phosphor having the nominal formula $Zn_2SiO_4$:Mn and a broad band emission peaking in the green region of the visible spectrum when stimulated by external radiation at approximately 254 nm, said phosphor having an average primary particle size of less than 5 µm and a plaque brightness equivalent to that of commercially available manganese activated zinc orthosilicate phosphors. In a narrower aspect, the phosphor has a submicron average primary particle size.

DETAILED DESCRIPTION OF THE PREFERRED EMBODIMENTS

An exemplary embodiment of the process in accordance with the invention involves the use of a fumed silica having an ultrafine particle size, typically 10–50 nm, as the silicon source in the starting formulation. The ultrafine fumed silica typically is electrostatically dispersed in an aqueous medium before addition of the remaining components of the starting formulation. Such a dispersion is commercially available as Cab-o-sperse A105 or A1095 solution, from Cabot Corporation, Tuscola, Ill.; Nyacol 2050, 2034DI, 2040, or 2040NH4 colloidal silica sols, from PQ Corporation, Valley Forge, Pa.; or Ludox AM colloidal silica liquid, from E. I. dupont de Nemours & Co., Inc., Wilmington, Del. This silica starting material has been found to change the reactivity of the zinc silicate starting components to enable synthesis of a zinc silicate phosphor with good plaque brightness and a much smaller premilling average primary particle size.

Into this dispersion of ultrafine silica are admixed compounds providing the zinc and manganese components of the phosphor. For example, compounds of zinc, e.g., zinc oxide, and manganese, e.g., manganese carbonate or manganese fluoride, may be stirred into the dispersion as a powder. Typically, the dispersion is diluted with deionized water heated, for example to about 50°–90° C., preferably about 70° C., and stirred to promote intimate mixing of the components in the dispersion. Because of the ultrafine particle size of the silica component, a more intimate contact is achieved in the dispersion or admixture with each particle of the metal containing components.

The dispersion may then be filtered to separate out the solid components, dried, and deagglomerated to provide a phosphor precursor powder. Typically, ammonium bifluoride is added to the dispersion to adjust the pH, aiding the filtration process. Also typically, the filtrate is dried for a time in excess of 6 hr in a drying oven at about 110° C. Agglomerates in the precursor powder typically are mechanically broken up using glass media in a shaking apparatus.

The precursor powder is then fired or calcined to produce the phosphor. For example, the calcining may be carried out in an inert atmosphere in a closed silica crucible at about 1050°–1300° C., preferably below about 1200° C., for about 4 hr. After cooling, the fired cake is broken up by gentle comminution, and may be washed with citric acid to sequester any unreacted manganese ions, which can discolor the phosphor. If desired, a second firing may be performed, for example, below 1200° C. in a closed vessel in an inert atmosphere. However, such second firing is not normally required with the process described herein. It has been found that reactivity of the components is significantly improved by the more intimate contact provided by the process without the necessity for a second and subsequent firings, fluxes, high temperatures, and extended firing conditions.

The following Examples are presented to enable those skilled in the art to more clearly understand and practice the present invention. These Examples should not be considered as a limitation upon the scope of the present invention, but merely as being illustrative and representative thereof.

EXAMPLES

A series of manganese activated zinc silicate phosphors was produced from a dispersion having the following component mole ratios: 1.077 mole % $SiO_2$, 2.0 mole % ZnO, 0.1317 mole % $MnCO_3$, the silica being in the form of the above-described ultrafine silica dispersion. Various combinations of reaction aids and finishing conditions were used to prepare the phosphors of the series, as shown in Table 1 below.

For each Example, the phosphor component powders and additives, if any, were added to the ultrafine silica dispersion. The admixture was heated to about 70° C. and stirred for about 2 hr. The precipitate was filtered with the addition of ammonium bifluoride to aid the filtering process and dried for over 15 hr in a drying oven at about 110° C. The resulting powder was mechanically deagglomerated in a shaker using glass media. The first or single firing was performed at 1200° C. for 4 hr in a closed silica crucible in an inert atmosphere. After cooling, the fired cake was gently comminuted to break up the agglomerates and, in all but Example 1, washed with citric acid to sequester unreacted Mn ions. In Example 3, a second firing was performed at about 1250° C. in a covered vessel in an inert atmosphere.

The phosphors in all Examples exhibited fine average particle size (as determined by scanning electron microscope examination), all having an average primary particle size (as determined by scanning electron microscope examination) of less than 5 µm before milling, and excellent brightness. In descending order, the relative primary particle sizes of Examples 4–11 were: Example 5 (largest), 10, 7, 8, 6, 9, 11, and 4 (smallest). The particle size of Examples 5 and 7 were also determined by the Coulter Counter method (which includes the sizes of any remaining agglomerates in its determinations) as being 4.89 and 5.02 µm, respectively. The analytical data for Examples 3–11 is shown below in Table 2, along with data for a comparative sample of a commercially available manganese activated zinc silicate phosphor derived from silicic acid by a solid state reaction, Sylvania Type 2288, available from Osram Sylvania Incorporated, Towanda, Pa.

The citric acid wash of Example 2 avoided the slight discoloring of the phosphor seen in Example 1. The second firing of Example 3 did not appear to result in any further improvement in brightness over parallel Example 2. Of the additives, only $WO_3$ appeared to significantly increase particle size. $NH_4Cl$ did not directly correlate with either grain size or brightness. Neither $NH_4F$ nor Aerosil appeared to increase the grain size. After milling the plaque brightness of the samples was still excellent. Thus all of the samples were suitable for use in either lighting or tagging applications.

TABLE 1

| EXAMPLES | ADDITIVES | FIRING | WASH |
|---|---|---|---|
| 1 | none | single firing | none |
| 2 | none | single firing | citric acid |
| 3 | none | two firings | citric acid |
| 4 | Aerosil* | single firing | citric acid |
| 5 | $WO_3$ | single firing | citric acid |
| 6 | $NH_4Cl$ | single firing | citric acid |
| 7 | Aerosil* $WO_3$ $NH_4Cl$ | single firing | citric acid |
| 8 | Aerosil* $WO_3$ | single firing | citric acid |
| 9 | Aerosil* $NH_4Cl$ | single firing | citric acid |
| 10 | $WO_3$ $NH_4Cl$ | single firing | citric acid |
| 11 | $NH_4F$ | single firing | citric acid |

*Aerosil ® 200, a dry fumed silica available from Degussa, Teterboro, New Jersey.

TABLE 2

| Example | Relative Brightness | Color Coordinates, x/y | Luminance, (fL) |
|---|---|---|---|
| Comp.* | 100 | 0.2472/0.7082 | 27.77 |
| 3 | 95.6 | 0.2459/0.7113 | 25.98 |
| 4 | 85.6 | 0.2437/0.7148 | 22.87 |
| 5 | 102.4 | 0.2458/0.709 | 27.36 |
| 6 | 94.5 | 0.2462/0.7112 | 25.24 |
| 7 | 102.7 | 0.2467/0.709 | 27.44 |
| 8 | 104.4 | 0.2457/0.709 | 27.88 |
| 9 | 94.3 | 0.2453/0.7118 | 25.19 |
| 10 | 106.1 | 0.2421/0.705 | 28.33 |
| 11 | 95.8 | 0.243/0.7124 | 25.59 |

*Sylvania Type 2288, available from Osram Sylvania Incorporated, Towanda, Pennsylvania.

The invention described herein presents to the art a novel, improved phosphor and method for producing the phosphor utilizing an ultrafine silica component in the starting formulation. The process has been found to produce a green emitting manganese activated zinc silicate phosphor exhibiting a particle size of less than 5 µm without significant loss of plaque brightness. The process requires only stoichiometric quantities of the starting components and only a single firing step to produce good brightness. The phosphor does not require extensive milling to achieve its fine particle size, thus avoiding loss of brightness due to the vigorous milling step required for prior art phosphors. The novel phosphor is suitable for use lighting applications as well as in tagging applications in which a fine particle size phosphor is necessary to avoid abrasion of the tagging equipment by the phosphor particles.

While there has been shown and described what are at present considered the preferred embodiments of the invention, it will be apparent to those skilled in the art that modifications and changes can be made therein without departing from the scope of the present invention as defined by the appended claims.

We claim:

1. A process for producing a manganese activated zinc orthosilicate phosphor having the nominal formula $Zn_2SiO_4$:Mn, said method comprising the steps of:

preparing a uniform aqueous dispersion comprising fumed silica having an ultrafine average particle size of less than 50 nm, a zinc precursor, and a manganese precursor, the molar ratio of zinc:silicon in said dispersion being approximately 1.3:1 to 2.0:1, and the molar ratio of manganese in said dispersion being sufficient to activate said phosphor;

calcining precipitate from said dispersion in an inert atmosphere at a temperature and for a time sufficient to form a manganese activated zinc silicate phosphor having a broad band emission peaking in the green region of the visible spectrum when stimulated by external radiation at approximately 254 nm.

2. A process in accordance with claim 1 wherein said zinc precursor consists essentially of zinc oxide.

3. A process in accordance with claim 1 wherein said manganese precursor substantially comprises manganese carbonate or manganese fluoride.

4. A process in accordance with claim 1 wherein said step of preparing said uniform aqueous dispersion comprises adding said zinc and manganese precursors as powders to an aqueous dispersion of said fumed silica; heating said fumed silica aqueous dispersion to a temperature of about 50°–90° C.; and mechanically dispersing said powders in said fumed silica aqueous dispersion to form said uniform aqueous dispersion.

5. A process in accordance with claim 1 wherein said uniform aqueous dispersion further comprises at least one reaction aid selected from the group consisting of tungsten oxide, ammonium chloride, and ammonium fluoride.

6. A process in accordance with claim 1 further comprising the step of milling said calcined phosphor to achieve an average particle size of less than 5 μm, wherein said milling step is performed without significant loss of plaque brightness.

7. A homogeneous manganese activated zinc silicate phosphor having the nominal formula $Zn_2SiO_4$:Mn and a broad band emission peaking in the green region of the visible spectrum when stimulated by external radiation at approximately 254 nm, said phosphor having an average primary particle size of less than 5 μm and a plaque brightness equivalent to that of commercially available manganese activated zinc orthosilicate phosphors.

* * * * *